United States Patent [19]
Eckert et al.

[11] Patent Number: 6,058,007
[45] Date of Patent: May 2, 2000

[54] COMPUTER WITH MOUNTING ARRANGEMENT FOR OPTIONAL UNIT

[75] Inventors: Yvan Eckert, Saint-Ismier; Richard Allirot, Corenc; Yves Bonfort, Herbeys, all of France

[73] Assignee: Hewlett-Packard Company, Palo Alto, Calif.

[21] Appl. No.: 08/925,573

[22] Filed: Sep. 8, 1997

[30] Foreign Application Priority Data

Sep. 24, 1996 [EP] European Pat. Off. .............. 96410098

[51] Int. Cl.⁷ .............................. H05K 7/14; H05K 1/14; G06F 1/16
[52] U.S. Cl. ......................... 361/684; 361/685; 361/731; 361/802
[58] Field of Search ..................................... 361/685, 752, 361/802, 731, 796, 686, 727, 683, 684; 439/928.1

[56] References Cited

U.S. PATENT DOCUMENTS

| | | | |
|---|---|---|---|
| 5,293,303 | 3/1994 | Fletcher et al. | 361/796 |
| 5,340,340 | 8/1994 | Hastings et al. | 361/727 |
| 5,481,434 | 1/1996 | Banakis et al. | 361/802 |
| 5,495,586 | 2/1996 | Adachi et al. | 395/280 |
| 5,706,179 | 1/1998 | Palatov | 361/802 |
| 5,768,099 | 6/1998 | Radloff et al. | 361/685 |
| 5,831,821 | 11/1998 | Scholder et al. | 361/686 |
| 5,865,518 | 2/1999 | Jarrett et al. | 361/683 |

FOREIGN PATENT DOCUMENTS

| | | |
|---|---|---|
| 0532346A2 | 9/1992 | European Pat. Off. . |
| 0532346A3 | 9/1992 | European Pat. Off. . |
| 0599504A1 | 11/1993 | European Pat. Off. . |
| 0637198A1 | 7/1994 | European Pat. Off. . |

*Primary Examiner*—Lynn D. Feild
*Assistant Examiner*—John D. Reed

[57] ABSTRACT

A computer has a mounting arrangement for enabling the same general internal space of the computer to be used either as a drive bay or as an expansion card slot. In one embodiment, the drive unit is mountable on the mounting arrangement by means of a mounting tray. In this case, the tray is preferably formed such that is serves as a blanking plate for blanking the access aperture provided in a housing wall of the computer for accessing external connectors of an expansion card when the latter is mounted in the mounting arrangement. The same fixing element used for securing the expansion card to the housing wall can also be used to secure the mounting tray to that wall.

9 Claims, 6 Drawing Sheets

ND MOUNTING
COMPUTER WITH MOUNTING ARRANGEMENT FOR OPTIONAL UNIT

FIELD OF THE INVENTION

The present invention relates to a computer provided with a mounting arrangement for an optional unit that may be an expansion card or a subsystem assembly such as a mass-storage drive assembly. In the present context, the term "optional unit" is to be understood as meaning a unit that is not required in each and every version of the computer provided with the mounting arrangement even though it may be required in some versions.

BACKGROUND OF THE INVENTION

It is standard commercial practice to provide several versions of the same basic computer, each version having different technical characteristics adapted to the needs of a particular group of users. Thus, for desktop computers, the provision of a graphics accelerator card may be essential for certain users but not for other users; to meet the demands of both types of users, a computer manufacturer may therefore provide one version of a computer with a graphics accelerator card and appropriate software, and a second version without the card (but generally with an expansion card slot enabling a user later to add a graphics accelerator card if so desired).

Generally, for desktop computers there are two types of optional units that can be included in a computer to enhance the basic design, these two types being an expansion card and a mass storage drive assembly. FIG. 1 shows an expansion card 10 provided with a standard edge connector portion 11 intended to plug into a standard edge connector provided in the computer, and a mounting plate 12 that can be secured by a fixing screw or other suitable means to a housing wall of the computer. Where the expansion card 10 is provided with external connectors, these project out from the mounting plate 12 to be accessible through an access aperture formed in the housing wall of the computer. The dimensions and electrical characteristics of expansion cards are usually well defined. The mounting zone and mounting elements provided in the computer for receiving an expansion card are frequently referred to as an "expansion card slot".

FIG. 2 depicts a mass storage drive unit here illustrated as a hard disc drive 15. Other forms of mass storage drive include floppy disc drives, CD-ROM drives and tape drives. All generally conform to particular size formats and are provided with standard fixing means (typically a series of threaded apertures 16 for receiving fixing screws by which the drive unit can be mounted in a metal mounting cage forming part of the basic support structure of the computer). Electrical connection to such drive units is usually provided by way of flying leads and one or more connectors that plug into the drive unit. The mounting zone and mounting elements provided in the computer for receiving a drive unit are frequently referred to as a "drive bay".

To provide both the manufacturer and user with the flexibility to add optional units as needed, it is now common practice to provide several expansion card slots and drive bays in a computer. The manufacturer populates the slots and bays according to the version of the computer to be produced whilst a user can add additional units as desired. However, an unused expansion slot or drive bay effectively represents unnecessary expense not only because of the obvious use of extra materials for the mounting elements and the larger housing size needed to accommodate the slot or bay, but also because the cooling and power supply systems of the computer must be designed for the case of all slots and bays being populated. There is therefore a tradeoff between providing extra slots and bays to increase flexibility and keeping their number down to reduce unnecessary costs. In addition, aesthetic considerations regarding the external size and shape of the computer (important in the home computer market), place a limit on the number of slots and bays that can be put in a computer.

It is an object of the invention to ease this conflict between flexibility and cost.

SUMMARY OF THE INVENTION

According to the present invention, there is provided a computer having a mounting arrangement comprising:
 a support structure;
 first mounting means for use in mounting a subsystem assembly on said support structure; and
 second mounting means for mounting an expansion card on the support structure in such a position that the expansion card is disposed in the same general space as would be occupied by a said subsystem assembly mounted by the first mounting means.

With this arrangement, the same space may be used as an expansion card slot or as a subsystem mounting bay (in particular, a drive bay where the subsystem assembly is a mass-storage drive assembly).

The support structure will normally include an external housing wall formed with an access aperture for enabling external access to connectors provided on an expansion card when mounted by said second mounting means; in this case, when a subsystem unit is mounted in the mounting arrangement, this unit (or a mounting tray carrying the unit) preferably serves to blank the access aperture. Furthermore, advantageously the same fixing means are used for securing the subsystem assembly to the housing wall as are used for securing an expansion card to the wall when the card is mounted in the mounting arrangement rather than a subsystem unit.

Preferably, the first mounting means comprises:
 support ledges provided on opposite sides of said general space and extending towards the housing wall, these ledges serving to seat flanges provided on opposite sides of a subsystem assembly such as to enable the subsystem assembly to be placed on the ledges and then slid towards the housing wall, and
 constraining elements overlying the ledges in such positions that the flanges of a subsystem assembly placed on the ledges and slid towards the housing wall enter between the constraining elements and the ledges to be constrained from movement perpendicular to the ledges.

According to another aspect of the present invention, there is provided a mounting tray for carrying a mass storage drive unit, the mounting tray including mounting elements for engaging in corresponding mounting means provided in a support structure of a computer, and a wall portion formed as a blanking plate for blanking an expansion card slot aperture.

According to a further aspect of the present invention, there is provided a method of manufacturing a computer comprising the steps of:
 (a) providing a support structure having both first mounting means for use in mounting a mass storage drive assembly on the support structure, and second mounting means for mounting an expansion card on the support structure in such a position that the expansion card is disposed in the same general space as would be occupied by a drive assembly mounted by the first mounting means; and (b) selectively mounting one of a drive assembly and an expansion card in the corresponding one of the first and second mounting means.

BRIEF DESCRIPTION OF THE DRAWINGS

A mounting arrangement embodying the invention will now be described, by way of non-limiting example, with reference to the accompanying diagrammatic drawings, in which.

BEST MODE OF CARRYING OUT THE INVENTION

Figure 3:
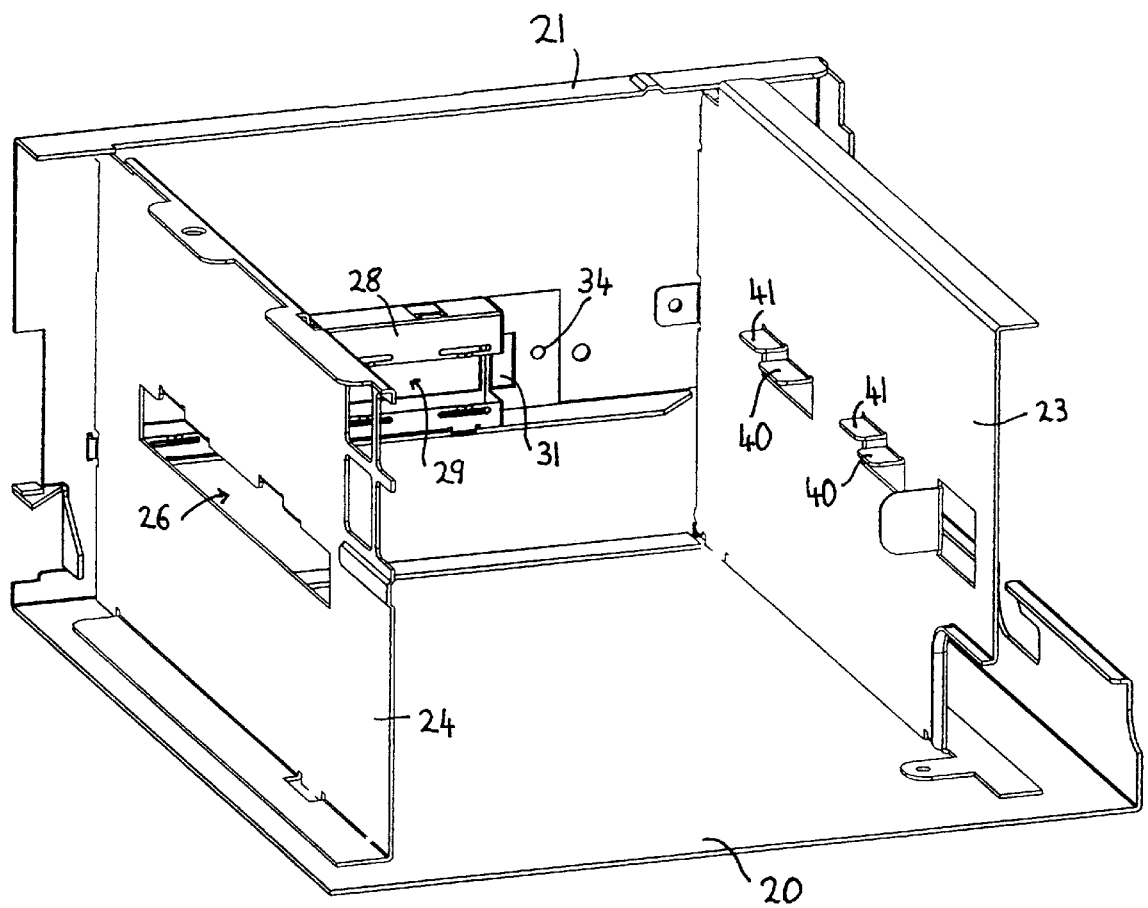
FIG. 3 is a perspective view of a support frame structure of the mounting arrangement embodying the invention.
Figure 4:
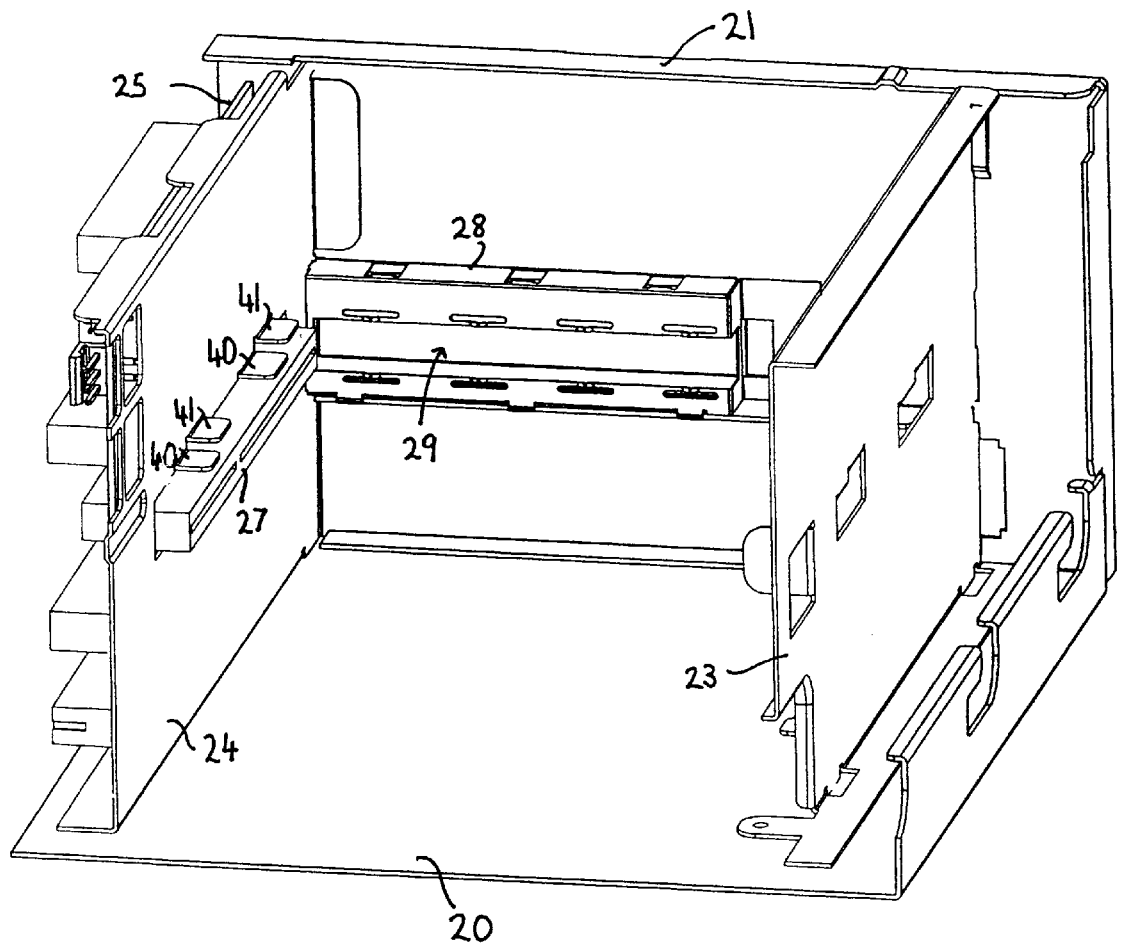
FIG. 4 is a perspective view similar to FIG. 3 but from a different viewpoint.

FIGS. 3 and 4 show part of a support frame structure of a computer embodying the present invention. More particularly, the support frame structure comprises a base plate 20 rigid with a housing wall 21 and two internal walls 23 and 24 that extend away from the housing wall 21 substantially at right angles to the latter. The elements 20 and 24 are of metal.

Figure 5:
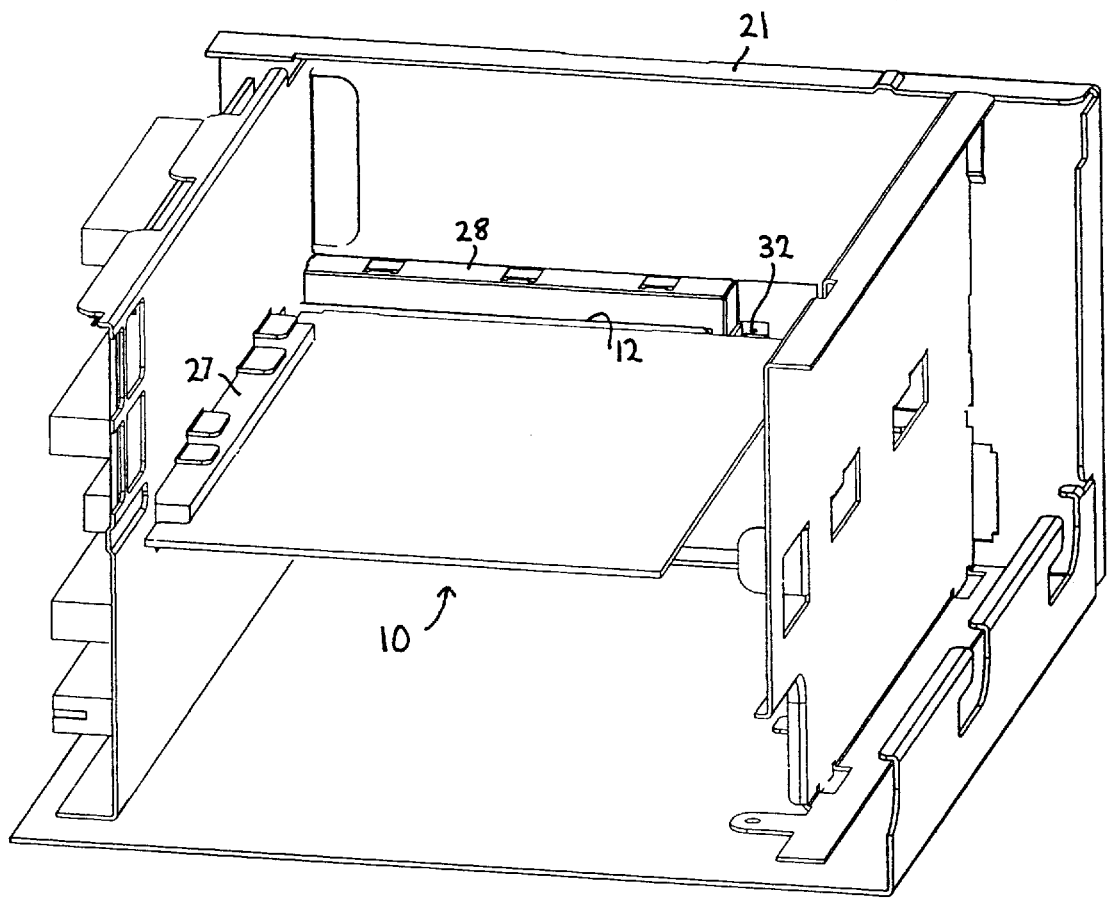
FIG. 5 is a view similar to FIG. 4 but showing an expansion card mounted in the mounting arrangement.

The support frame structure is adapted to mount an expansion card between the internal walls 23 and 24 in a position about half way up these walls and in a plane substantially parallel to the base 20. To this end, a circuit board 25 mounted on the side of the wall 24 away from the wall 23, carries an edge connector 27 that projects through an aperture 26 in wall 24 to lie within the space between the walls 23 and 24 (the circuit board 25 and the edge connector 27 have been omitted from FIG. 3 for the purpose of clarity). The edge connector serves to receive the connector portion 11 of an expansion card 10 (see FIG. 1). A mounting bridge 28 is provided on the housing wall 21 at the same level as the connector 27. This mounting bridge 28 has an access aperture 29. The mounting bridge 28 serves to seat the mounting plate 12 of an expansion card when the latter is inserted into the connector 27; in this position, any external connectors provided on the card 10 are accessible through the access aperture 29. FIG. 5 illustrates an expansion card plugged into the connector 27 with its mounting plate 12 against mounting bridge 28.

To hold the expansion card in position, fixing means are provided to secure the mounting plate 12 against the bridge 28. The fixing means can be constituted by a fixing screw as is standard or, alternatively, a clamping lever arrangement.

In the present embodiment, a clamping lever arrangement is used and to this end the housing wall 21 is formed with a rectangular aperture 31 and with a screw-threaded aperture 34.

Figure 9:
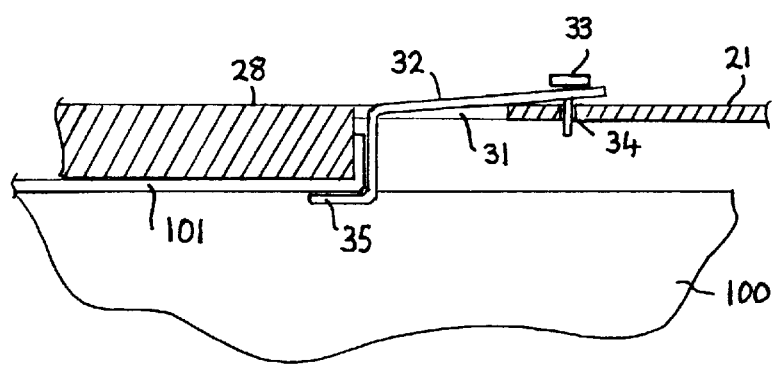
FIG. 9 is a diagram illustrating the operation of a clamping lever of the mounting arrangement as used in FIGS. 5 and 8.

FIG. 9 illustrates the general operation of the clamping lever arrangement. More particularly, a crank-shaped clamping lever 32 is passed through the aperture 31 such that an end portion 35 of the lever can clamp an element 101 of an unit 100 (in this case, the mounting plate 12 of the card 10) between the clamping lever 32 and the mounting bridge 28. The shaft of a screw-threaded member 33 passes through a hole in the external part of the lever 32 and engages in the threaded aperture 34. The member 33 can be screwed down by a user from externally of the housing to tighten up the clamping lever by a pivoting action about an edge of the aperture 31 whereby to secure the unit 100 provided with the element 101 against the housing wall 21.

The edge connector 27, mounting bridge 28 and clamping lever arrangement described above thus serve as mounting means for mounting an expansion card within a general space located half way up between the walls 23 and 24.

Figure 2:
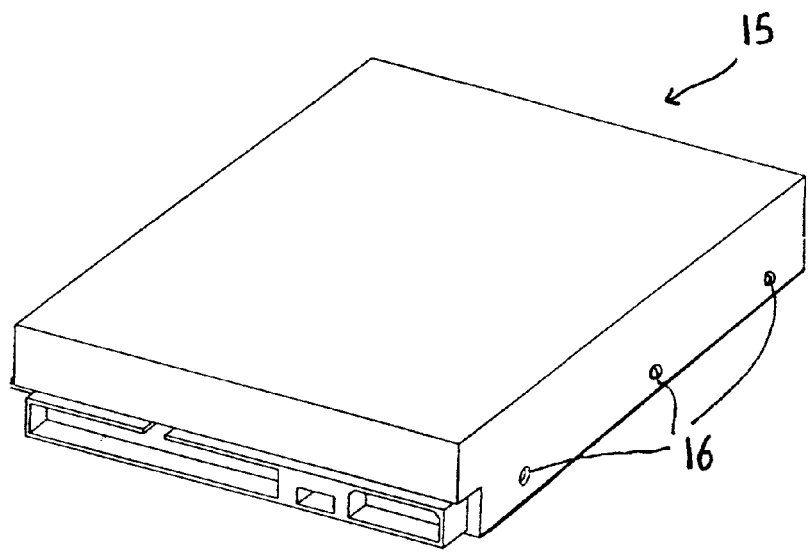
FIG. 2 is a perspective view of a known disc drive unit.
Figure 6:
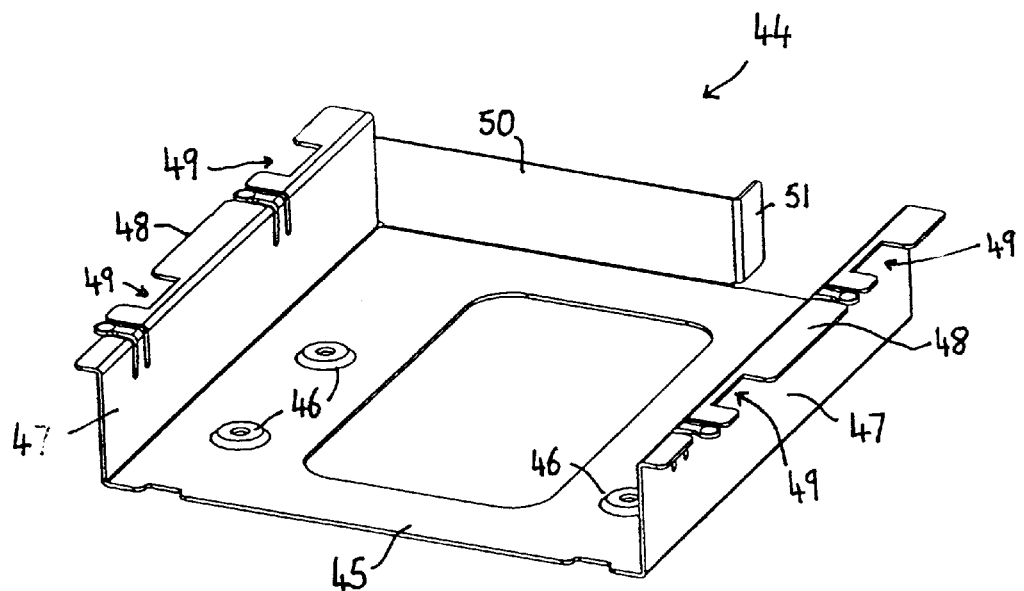
FIG. 6 is a perspective view of a drive mounting tray of the mounting arrangement.
Figure 7:
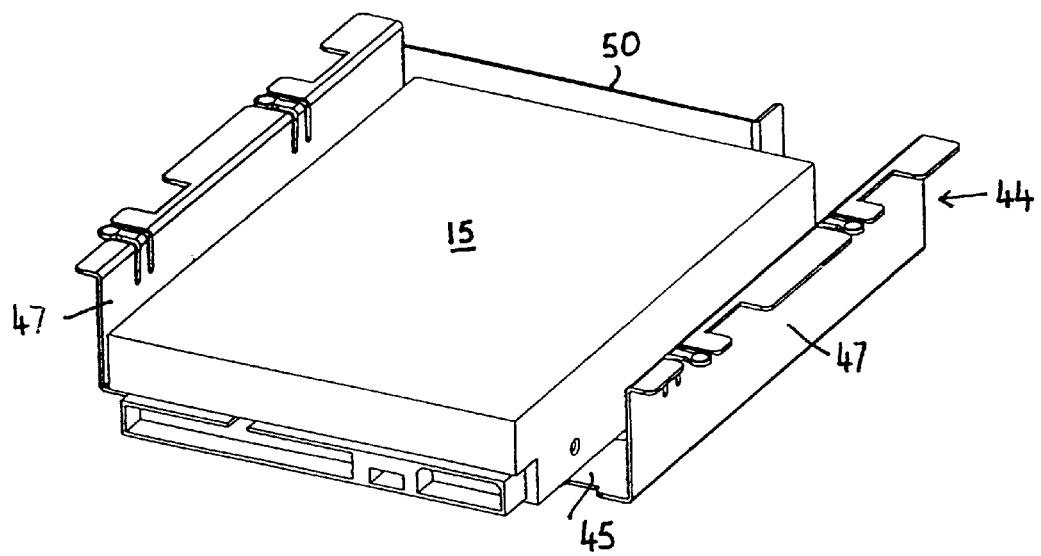
FIG. 7 is a perspective view similar to FIG. 6 but showing the FIG. 2 disc drive unit mounted on the mounting tray.
Figure 8:
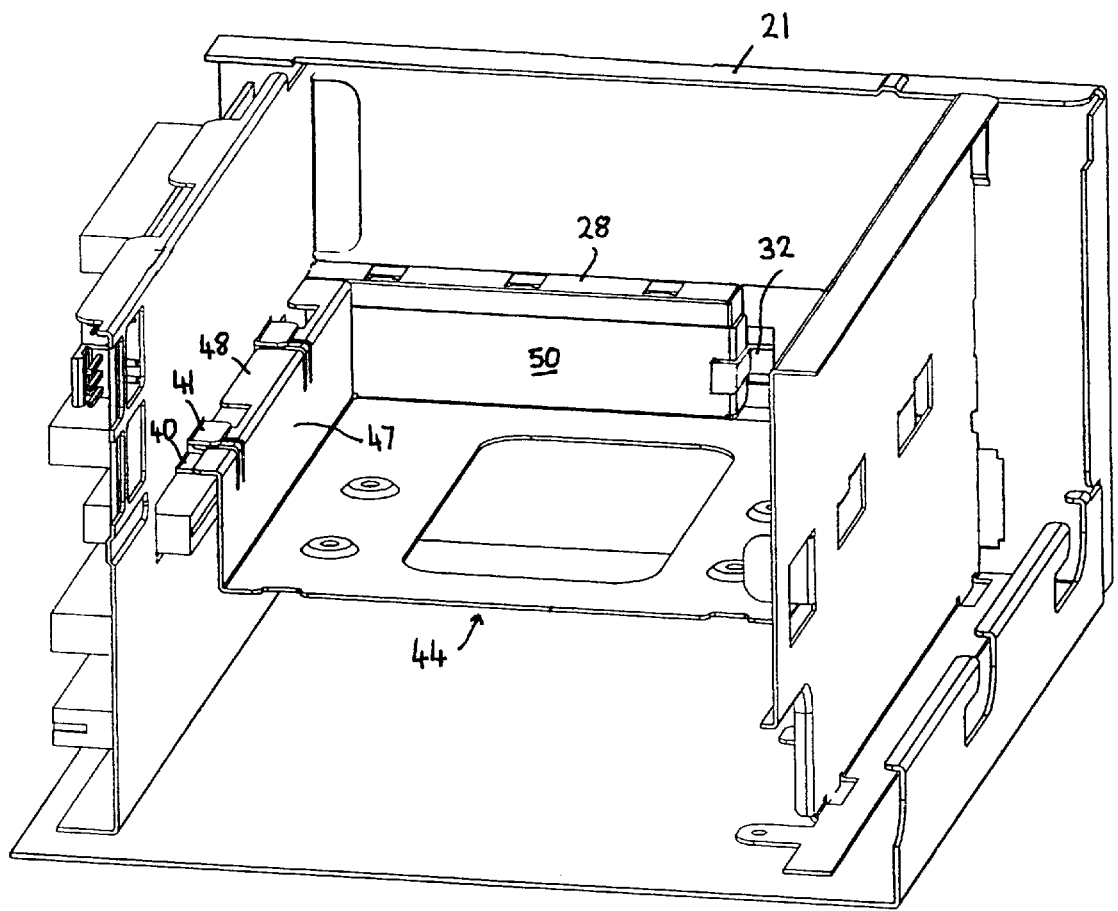
FIG. 8 is a view similar to FIG. 4 but showing the FIG. 6 mounting tray mounted in the mounting arrangement.

The support frame structure is also provided with means for mounting a mass storage drive assembly in the same general space located half way up between the walls 23 and 24. In the present embodiment of the invention, the drive assembly comprises a disk drive unit 15 of the FIG. 2 form and a mounting tray 44 (see FIG. 6) for carrying this drive unit 15 (see FIG. 7).

More particularly, the mounting tray 44 comprises a base member 45 having four apertured bosses 46 aligned with threaded apertures (not visible) provided in the underside of the unit 15. The unit 15 is secured on the tray 44 by means of screws passed through the apertured bosses 46 and engaged in the threaded aperture provided in the bottom of the unit 15.

The mounting tray 44 has two side walls 47 each provided with flanges 48 formed with recesses 49. In addition, the tray 44 has a front wall 50 with a lip 51. This front wall 50 and the lip 51 have a form similar to the mounting plate 12 such that the wall 50 can act as a blanking plate over the access aperture 29 in the bridge 28 and such that the clamping lever arrangement can be used to clamp the tray 44 by its front wall against the mounting bridge 28.

Returning to FIGS. 3 and 4, the walls 23 and 24 are each provided with ledges 40 and constraining members 41 (in the present embodiment, also in the form of ledges). The sizes and positions of the recesses 49 in the flanges 48 of tray 44 are such that the tray 44 can be lowered down between the walls 23 and 24 to engage the flanges 48 on the ledge 40, the constraining member 41 passing through the recesses 49.

Once the tray 44 (with drive unit 15) have been lowered onto the ledges 40, it can be slid towards the housing wall 21 to move its wall member 50 up against the mounting bridge 28. This action moves the flanges 48 beneath the constraining members 41 so that the tray 44 is constrained from being moved upwards.

With the mounting tray 44 positioned up against the mounting bridge 28, the clamping lever 32 already described above with reference to FIG. 9, can be used to secure the tray 44 against the bridge 28. The clamping is effected in the same manner as already described except that now the element 101 in FIG. 9 is the front wall 50 of the tray 44 and the member 100 is the mounting tray itself.

It will be appreciated that when so mounted, the tray wall 50 blanks off the access aperture 29 and the disc drive assembly occupies the same general space as an expansion card inserted in connector 27.

It will further be appreciated that although the drive assembly carried by the mounting tray has been described as a hard disc drive and therefore generally not requiring user access, it would be possible to mount a drive requiring external access on the tray 44. In this case, the tray would require some modification—for example, the wall 50 could be removed to enable limited access to the drive through aperture 29.

Whilst the mounting tray 44 has been described above as intended for mounting a mass-storage drive assembly, it will be understood that the tray could readily be adapted to mount other types of sub-system assembly. In particular, the tray is particularly suited for carrying substantial subsystems such as those with mechanical moving parts; thus, by way of example, the sub-system could be a small printer outputting a printed strip through aperture 29. Another example sub-system is a tamper-proof/tamper-evident cryptographic unit.

We claim:

1. A computer having a mounting arrangement comprising:
    a support structure having first and second opposite sides and a third side adjacent to said first and second opposite sides;
    first mounting means for use in removably mounting a subsystem assembly on said support structure, said first mounting means comprising mounting elements on said first and second opposite sides for supporting said subsystem assembly on opposite edge portions thereof; and
    second mounting means for mounting an expansion card on said support structure in such a position that the expansion card is disposed in a general space of rectangular plan form as would be occupied by a said subsystem assembly mounted by said first mounting means, said second mounting means comprising an edge connector on one of said opposite sides for receiving said expansion card and mounting elements on said third adjacent side for supporting said expansion card at two adjacent sides thereof.

2. A computer according to claim 1, wherein said support structure includes an external housing wall formed with an access aperture for enabling external access to connectors provided on an expansion card when mounted by said second mounting means, and fixing means provided on said housing wall adjacent said aperture for securing said expansion card to said housing wall, said fixing means also forming part of said first mounting means.

3. A computer according to claim 2, wherein said fixing means comprises a clamping lever with externally-operable screw-threaded means.

4. A computer according to claim 2, further comprising a drive-unit mounting tray forming part of a said subsystem assembly, said mounting tray being mounted directly by said first mounting means with said fixing means directly engaging said mounting tray.

5. A computer according to claim 1, wherein said support structure includes an external housing wall formed with an access aperture for enabling external access to connectors provided on an expansion card mounted by said second mounting means, said second mounting means comprising an edge connector for receiving said expansion card and fixing means provided on said housing wall adjacent said aperture for securing said expansion card to said housing wall, said first mounting means serving to mount a said subsystem assembly in such a position that a wall portion of the subsystem assembly acts as a blanking plate blanking off said access aperture.

6. A computer according to claim 5, further comprising a drive-unit mounting tray forming part of said subsystem assembly, said mounting tray being mounted directly by said first mounting means and including said wall portion acting as a blanking plate.

7. A computer according to claim 2, wherein said first mounting means comprises:
    support ledges provided on said support structure on opposite sides of said general space, said ledges serving to seat flanges provided on opposite sides of a said subsystem assembly such as to enable the subsystem assembly to be placed on the ledges and then slid towards said housing wall, and
    constraining elements provided on said support structure adjacent said ledges in positions such that the said flanges of a said subsystem assembly placed on the ledges and slid towards the said third side become trapped between said constraining elements and the ledges.

8. A computer according to claim 7, further comprising a drive-unit mounting tray forming part of said subsystem assembly, said mounting tray including said flanges provided along opposite sides thereof.

9. A computer according to claim 1, wherein said subsystem assembly is a mass storage drive assembly.

* * * * *

UNITED STATES PATENT AND TRADEMARK OFFICE
CERTIFICATE OF CORRECTION

PATENT NO. : 6,058,007

DATED : May 2, 2000

INVENTOR(S) : YASUYUKI MIYAOKA

It is certified that error appears in the above-identified patent and that said Letters Patent is hereby corrected as shown below:

ON THE TITLE PAGE [56] References Cited:

U.S. PATENT DOCUMENTS, insert
        --5,936,915  8/1999  Fujii et al.     369/13
          5,831,943  11/1998 Kurita et al.    369/13
          5,862,103  1/1999  Matsumoto et al. 369/13--.

ON THE TITLE PAGE [57] ABSTRACT:

Line 3, "profiled" should read --profile--.

Figure 1:
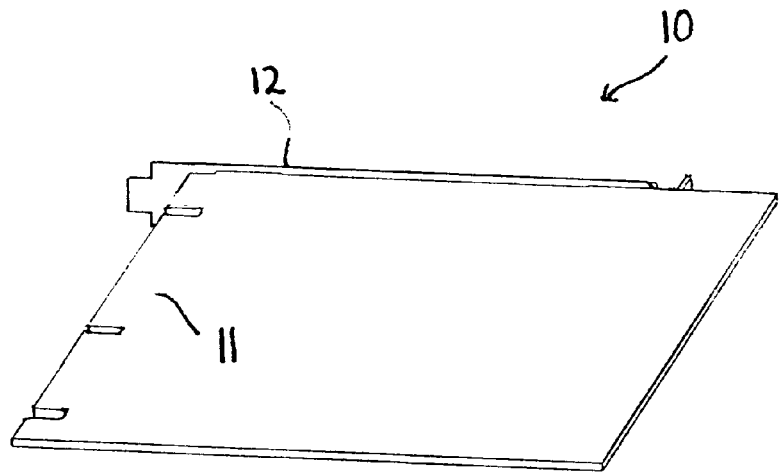
FIG. 1 is a perspective view of a known expansion card.

SHEET 1:

FIG. 1, "MOVMENT" should read --MOVEMENT--.

COLUMN 5:

Line 61, "principle" should read --principal--.

COLUMN 7:

Line 33, "detects a" should read --detects $\alpha$--.

COLUMN 9:

Line 2, "pseudo random" should read --pseudo-random--;
    Line 7, "satisfies=(i-0.4)" should read
        --satisfies $\beta$=(i-0.4)--; and
    Line 34, "amount $\alpha$" should read --amount $\beta$--.

UNITED STATES PATENT AND TRADEMARK OFFICE
CERTIFICATE OF CORRECTION

PATENT NO.   : 6,058,007
DATED        : May 2, 2000
INVENTOR(S)  : YASUYUKI MIYAOKA

It is certified that error appears in the above-identified patent and that said Letters Patent is hereby corrected as shown below:

COLUMN 11:

Line 21, "pseudo random" should read --pseudo-random--.

COLUMN 12:

Line 42, "hen" should read --when--.

Signed and Sealed this

Tenth Day of April, 2001

Attest:

NICHOLAS P. GODICI

Attesting Officer        Acting Director of the United States Patent and Trademark Office